United States Patent

[11] 3,618,746

| | | |
|---|---|---|
| [72] | Inventor | Paul D. Suloff<br>Akron, Ohio |
| [21] | Appl. No. | 862,831 |
| [22] | Filed | Oct. 1, 1969 |
| [45] | Patented | Nov. 9, 1971 |
| [73] | Assignee | The Goodyear Tire & Rubber Company<br>Akron, Ohio |

[54] BELT ASSEMBLY
13 Claims, 7 Drawing Figs.

[52] U.S. Cl. .................................................... 198/165,
198/193
[51] Int. Cl. ....................................................... B65g 15/14
[50] Field of Search ............................................ 198/165,
193

[56] References Cited
UNITED STATES PATENTS

| 920,264 | 5/1909 | Butler.......................... | 198/165 |
| 3,319,776 | 5/1967 | Bechtloff et al. ............. | 198/165 |
| FOREIGN PATENTS | | | |
| A19,690 | 4/1956 | Germany..................... | 198/165 |

Primary Examiner—Robert G. Sheridan
Assistant Examiner—Lawrence J. Oresky
Attorneys—F. W. Brunner and Ronald P. Yaist ABSTRACT: A material-retaining belt of the type used as a cover belt disposed above and in confronting relationship to a material-conveying base conveyor belt in a conveyor system in which the two belts cooperate to transport bulk material from one level to another without spillage or slippage thereof. The retaining belt has a generally rectangular cross section for at least a majority of its width and includes a first portion of elastomeric material containing weighting means, such as lead dust, therein and a second portion in substantially parallel relationship with the first portion which contacts the material being conveyed. The second portion has a center section containing longitudinally extending tension elements and at least substantially unreinforced lateral sections on either side of the center section to enable the retaining belt to drape over and firmly contain the material being conveyed. Particularly when lumpy material is being conveyed, the retaining belt also preferably includes edge portions additionally weighted and adapted to conform to the confronting surface of the edges of the conveying belt to effect a seal to contain the material.

INVENTOR.
PAUL D. SULOFF
ATTORNEY

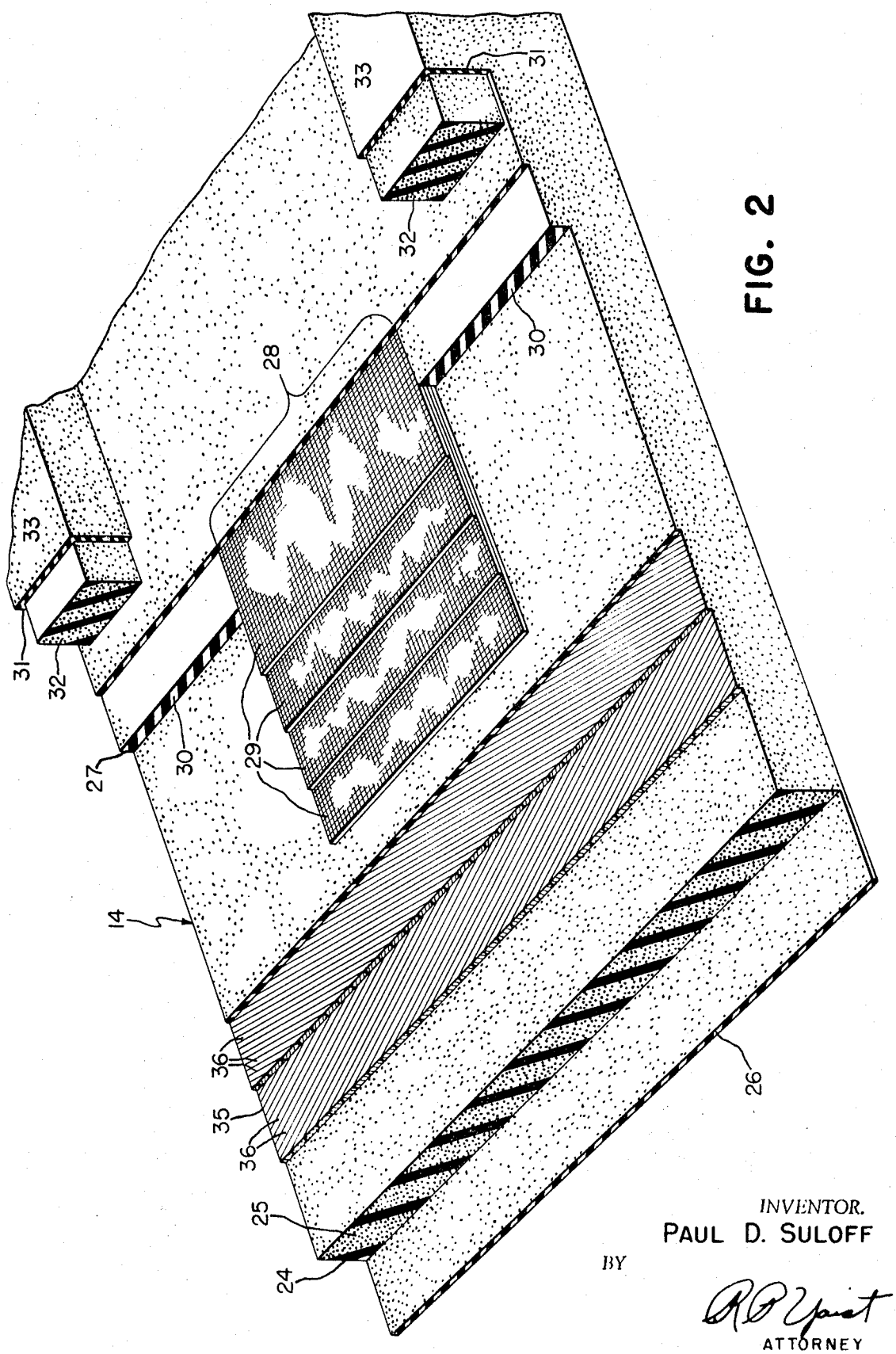

INVENTOR.
PAUL D. SULOFF
BY
ATTORNEY

BELT ASSEMBLY

BACKGROUND OF THE INVENTION

This invention relates to conveyor systems for transporting bulk materials and more particularly, to a conveyor system for transporting such materials from one level to another without spillage thereof. This invention has particular application to a material-retaining belt of special construction which is disposed above and in confronting relationship to a material-conveying base conveyor belt in such a system with the two belts cooperating to transport the bulk material therebetween.

It is well known that many problems are encountered in transporting bulk materials, such as grain, coal, ore and sand, by means of a belt conveyor. For example, when such bulk materials are carried up an incline on a conveyor belt, the maximum angle of elevation is limited by the coefficient of friction between the belt surface and the surface of the materials being conveyed or by the tendency of lumps to roll. If the angle of incline is too steep, the load will slide or roll back on the belt surface. This can cause serious problems, for instance, the mass slipping of a load may bury a portion of the conveyor and cause serious cleanup delays. Normally the maximum angles of incline are from about 12 to about 23 degrees, depending upon the material being conveyed (table 12-A, page 178, "Handbook of Belting" the Goodyear Tire & Rubber Company). Another related problem is the tendency of a conveyor belt to lift off the supporting surface when traversing a small radius concave curve in its path of travel. In addition, low-density materials are likely to be blown or bounced off the conveying belt whether or not the materials are being conveyed up an incline. Furthermore, during high wind conditions, it is possible that the belt conveyor can be blown off the conveyor structure.

The attempts to solve these beforementioned problems by the prior art have not proven to be entirely successful. For example, one means which has been attempted is to cover the load by positioning a second belt in confronting relationship to the material-conveying belt in efforts to contain the material between the belts and thereby prevent the spillage thereof as the conveying belt travels up inclines. In most instances, however, these material-retaining or cover belts, sometimes referred to as "hugger" belts, have been more or less conventional conveyor belt construction and have not been designed to properly conform to the load being carried. Consequently, this arrangement has not prevented the spillage of bulk materials between the belts. More importantly, since the retaining belts have been of conventional construction, they have been of insufficient weight to prevent slippage of the bulk materials on the surface of the conveying belt. Also, due to this insufficiency of weight, the retaining or hugger belts have not prevented the conveyor belt from lifting off its supporting structure when traversing small radius concave curves or from being blown off the conveyor structure during storms or high wind conditions.

In the prior art, Sandgangr U.S. Pat. No. 2,861,673 discloses a retaining type belt composed of heavy nonextensible chain elements which act as a net to contain the load carried by a lower conventional conveyor belt. The chain belt enables the conventional belt to negotiate steep inclines in its path of travel. This retaining belt, however, has some very obvious disadvantages since the metal chains or links are subject to excessive wear, breakage and corrosion. Furthermore, this structure obviously cannot prevent low density materials from being blown from the conveying belt surface.

The present invention overcomes the disadvantage of the prior art by providing a material-retaining belt of special construction which will be hereinafter described.

OBJECTS OF THE INVENTION

It is an object of this invention to provide a material-retaining belt of special construction to be used in a belt conveyor system for transporting bulk materials up inclines without spillage or slippage thereof and at greater angles of incline then normally possible heretofore.

It is another object of this invention to provide a belt conveyor system in which the material conveying belt is held on its supporting surface by a specially constructed material-retaining belt while transversing a small radius concave curve in its path of travel.

It is also an object of this invention to provide a belt conveyor system which includes a material-retaining belt of special construction to prevent low-density materials from being blown or bumped off the conveying belt surface.

It is still another object of this invention to provide a belt conveyor system with a unique belt combination that will resist being blown off the conveyor structure during high wind conditions.

Other objects and advantages of this invention will become apparent hereinafter as the description thereof proceeds, the novel features, arrangements and combinations being clearly pointed out in the specification as well as the claims thereunto appended.

It has been found that the beforementioned problems are overcome in accordance with the present invention which provides a flexible resilient material-retaining belt of the type used as a cover belt disposed above and in confronting relationship to a material-conveying base conveyor belt in a conveyor system in which the two belts cooperate to transport bulk material from one level to another. The retaining belt has a generally rectangular cross section through at least a majority of its width and includes a first portion of elastomeric material extending substantially longitudinally and transversely thereof which contains weighting means therein to hold the retaining belt against the material being conveyed and thereby prevents the slippage of the material on the surface of the conveying belt and enables the conveying belt to transverse small radius concave curves in it path of travel. The retaining belt also includes a second portion of elastomeric material which is adjacent to and in substantially parallel relationship with the first portion and contacts the material being conveyed. The second portion also includes a center section containing a plurality of tension elements extending longitudinally of the retaining belt to prevent excessive elongation thereof and also includes at least substantially unreinforced lateral sections adjacent to the center section on either side thereof to provide a maximum amount of transverse flexibility in the unreinforced sections. This permits the retaining belt to drape over and firmly contain the material being conveyed on the conveying belt. Particularly when lumpy material is being conveyed, the retaining belt preferably further includes edge portions which extend longitudinally thereof and are associated with the lateral sections of the second portion. The edge portions are adapted to conform to the confronting surface of the edges of the material-conveying belt, thereby effecting a seal to contain the material being conveyed. All the portions of the retaining belt are formed into an integral composite structure with the weight of the retaining belt preventing the slippage of the bulk material and the overall weight provided by the combination of the retaining and conveying belts resisting effects of high winds conditions which might otherwise result in the belts being blown off the supporting structure.

BRIEF DESCRIPTION OF THE DRAWINGS

In the drawings:

FIG. 2 is an enlarged sectional view through line 2—2 of FIG. 1;

DESCRIPTION OF THE PREFERRED EMBODIMENTS

Figures 1, 3:
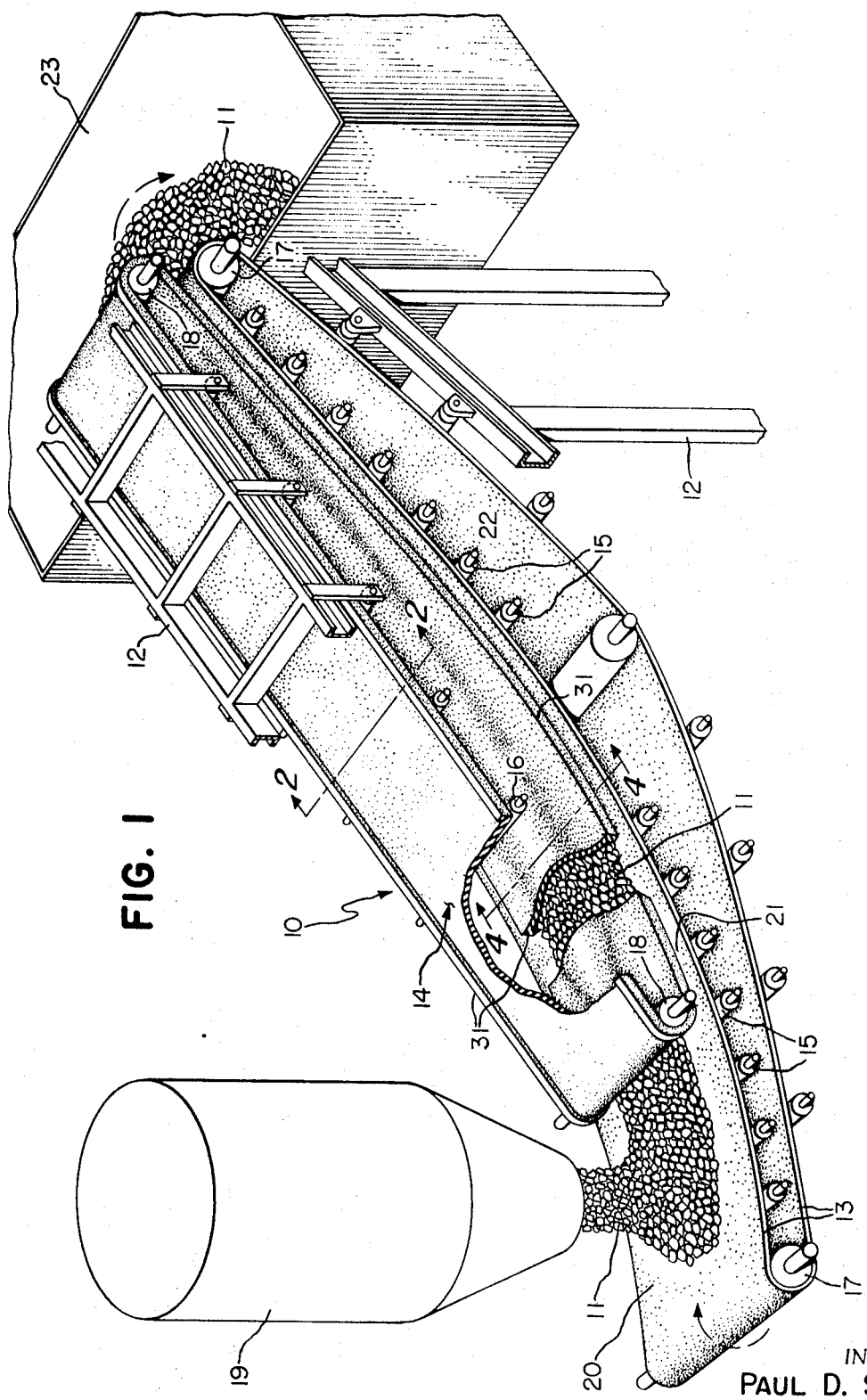
FIG. 1 is a perspective view of the belt conveyor system of this invention including the specially constructed material-retaining belt with parts broken away to more clearly indicate the inventive features.
FIG. 3 shows a modification of the invention shown in FIG. 2.

In the drawings FIG. 1 shows a belt conveyor system 10 for transporting bulk materials 11, such as grain, coal, ore, sand and the like. As illustrated, the conveyor system 10 includes a structure 12 providing support for a material-conveying base belt 13 and a material-retaining belt 14 which is disposed above the conveying belt 13 and in confronting relationship thereto. The material retaining belt 14 acts to cover or hug the material 11 being conveyed on the conveying belt 13 to prevent its spillage, especially when the conveying belt 13 moves from one level to another. The conveying belt 13 and retaining belt 14 are operated by driving means (not shown) at synchronous speeds over rollers 15 an 16 respectively and between pulleys 17 and 18 respectively mounted to the supporting structure 12.

For the purposes of illustration, in operation the bulk material is fed from a discharge hopper 19 or other appropriate apparatus onto the conveying belt 13 on a substantially horizontal run 20 thereof. The conveying belt 13 traverses a small radius concave curve 21 in its path of travel as it transports the material 11 up an incline run 22 of the belt 13 having an angle of incline of about 30 degrees. The retaining belt 14 meets or converges with the conveying belt 13 as the latter begins to traverse the concave curvature 21 in its contour. The belt 13 and 14 then cooperate to transport the material 11 up the incline run 22 from which the material 11 is deposited either directly or by means of additional belt conveyors into a loading bin 23 of a ship, railroad hopper car or the like.

The special construction features of the material-retaining belt are best shown with reference to FIG. 2. The belt 14 has a generally rectangular cross section through at least the majority of its width and includes a first portion 24 of elastomeric material extending substantially longitudinally and transversely thereof which rides against the rollers 16 and pulleys 18. The elastomeric material, for example, is formulated from a high-density compound containing weighting means, such as lead 25 or other ballast material, preferably uniformly dispersed therein. These compounds should have a specific gravity of at least 3.00. For example, it has been found that a natural rubber compound containing a substantial quantity of a metallic particulate material having a specific gravity of at least 6.00 is particularly suitable for this application. Lead dust with a specific gravity of about 11.85 is most satisfactory as the metallic material. Preferably, a pulley cover or layer 26 of high abrasion resistant elastomer is applied over the portion 24. The thickness of the layer is, for example, about 1/16 of an inch. The thickness of the weighted portion 24 of the belt 14 in general should be in the range of from about one-half to about three-quarters of he overall thickness of the belt 14, excluding any protruding or extending edge portions. The weighted portion 24 forces or presses the retaining belt 14 against the material 11 being conveyed so as to prevent it from slipping on the surface of the conveying belt 13 as it proceeds up the inclined run 22. The weighted belt 14, due to its weight acting directly on or through the material on the conveying belt 13, permits the belt 13 to traverse small radius concave curves 21 in its path of travel without lifting off the supporting surface 12 and spilling the material 11 being conveyed.

The retaining belt 14 also includes a second portion 27 of elastomeric material adjacent to and in substantially parallel relationship with the first portion 24. The second portion 27 comes in direct contact with the material 11 being conveyed on the conveying belt 13 and, therefore, is preferably composed of a high abrasion resistant natural or synthetic rubber formulation. Of course, if additional belt weight is required, the portion 27 as well as the first portion 24 can also be formed from a high-density elastomeric material. This portion 27 has a center or tension section 28 which contains a plurality of tension elements extending longitudinally of the retaining belt to prevent excessive elongation during its operation. The tension elements are important since the retaining belt is invariably operated at the same speed as the conveying belt. The tension elements are in the form of a number of plies 29 of square woven textile fabric, such as cotton, nylon, rayon, or polyester, but also could be made up of, for example, a plurality of textile fabric or fiberglass cords or steel cables. For example, four plies of a 32-ounce cotton fabric provides the belt with the necessary longitudinal stability for a typical application.

Figure 4:
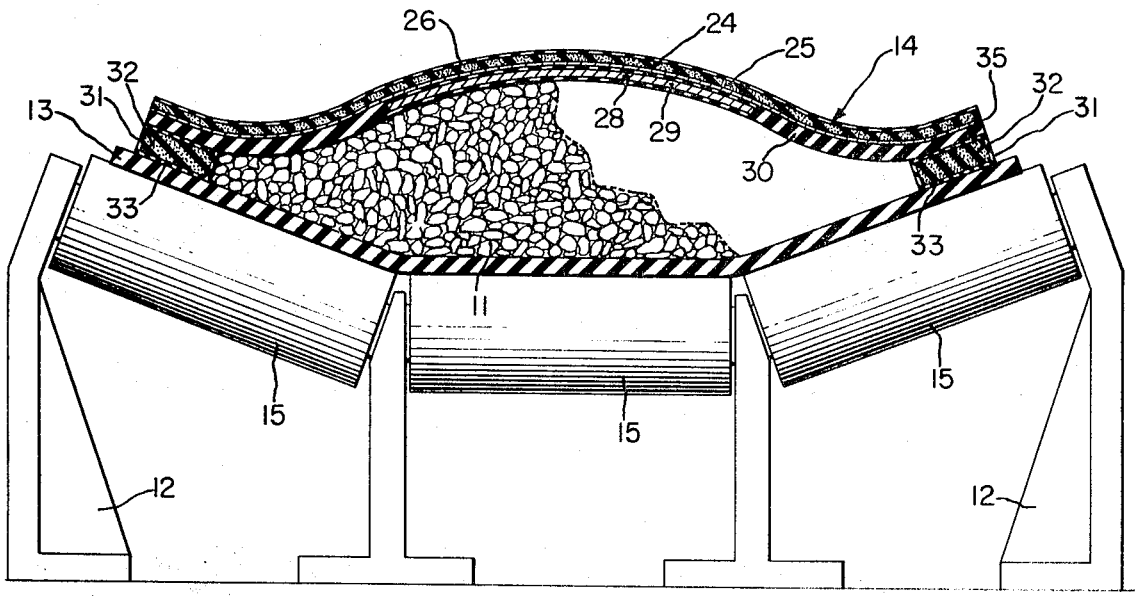
FIG. 4 is a sectional view taken through line 4—4 of FIG. 1.

The portion 27 also includes lateral sections 30 adjacent to the center section 28 on either side thereof which are at least substantially unreinforced to provide a maximum amount of transverse flexibility. The unreinforced sections 30 permit the retaining belt 14 to drape over nd firmly contain the material 11 being conveyed as shown in FIG. 4. The best transverse flexibility is achieved if the width of the center section 28 is less than one-half the total width of the retaining belt 14. Although the specific dimension will vary, it has been found that both the necessary longitudinal stability and transverse flexibility is obtained in 44 wide retaining belt having a tension section about 18 wide, while a 60-inch retaining belt functions properly with a tension section having a width about 24 inches.

The retaining belt 14 preferably further includes edge portions 31 extending longitudinally thereof which in this case are in the form of weighted blocks or ribs 32 which protrude from the lateral sections 30 of the second portion 27. The blocks 32 may be continuous or discontinuous along the lateral edges of the retaining belt 14 and are preferably formed of a high-density elastomeric material. For example, the blocks 32 may be formed of the same lead-loaded elastomeric compound as used to form the weighted portion 24 of the belt 14. The blocks 32 also preferably include a cover layer 33 of abrasion resistant elastomeric material similar to that of the pulley cover layer 26 of the belt 14. This layer 33, for example, is about 1/32 of an inch thick. The blocks 32 are generally about 1 inch thick and 4 inches in width. The thickness is generally limited because of pulley bending restrictions but the blocks 32 can also be as wide as about 8 inches. The edge portions 32 are adapted to conform to the confronting surface of the edges of the conveying belt 13 as will be more fully described in relation to FIG. 4.

As shown in FIG. 3, the edge portions of the material-retaining belt 14 may also be in the form of contiguous or interrupted blocks 34 of metal which are molded to or otherwise attached to the belt 14.

The retaining belt 14 under usual circumstances, also includes a longitudinally extensible transverse reinforcing layer 35 of preferably textile fabric cords 36 positioned between the first and second portions 24 and 27 to provide the belt 14 with the necessary internal strength while still maintaining the maximum amount of transverse material. For example, nylon tire cord cut on a 15-degree bias or at an angle of 75 degrees to the edge of the belt is particularly suitable for this purpose. However, other conventional and special reinforcing material well known in the art can also be used, such as cotton, rayon, polyester and fiberglass. Ordinarily, the transverse reinforcing layer 35 should be limited to two plies of tire cord in order that the proper draping effect can be achieved, s shown in FIG. 4.

The retaining belt 14 is built and vulcanized into integral composite structures by the use of conventional equipment for this purposes. Various lengths, widths, thicknesses, and weights are possible, depending upon the particular application. The weight and size of the retaining belt is determined by such factors as the amount and physical properties of the material being conveyed and the desired angle of inclination of the conveying belt. By the practice of this invention, retaining belts having an effective weight in excess of 200 pounds per foot can be provided with the specific weight, of course, varying with the particular application.

The retaining belt's function is most clearly shown with reference to FIG. 4 which shows the retaining belt 14 in confronting relationship to the material-conveying belt 13 with bulk material 11, such as iron ore pellets being contained therebetween. The conveying belt 13 is more or less conventional construction including, for example, nylon reinforcement, although it may also include a protective layer of shredded wire to prevent the penetration of sharp objects into the carcass of the belt as disclosed in Hacker U.S. Pat. No. 3,246,735. The conveyor belt 13 operates over rollers 15 attached to the conveyor structure 12 and disposed in such a manner to provide the belt 13 with a trough of approximately 35 degrees. The conveying belt 13 is normally wider than the retaining belt 14 by about 4 inches or more. For instance, a 60-inch wide base conveying belt operates in conjunction with a 56-inch wide retaining belt. This permits the weighted edge portion 31 to lie within the extreme edge of the conveying base belt 13 on the area of the base belt 13 which is normally bare of the material 11 being conveyed, thus effecting a sealing relationship between the two belts 13 and 14 to contain the material 11. Conversely, it prevents the edge of the retaining belt 14 from extending beyond the edge of the base belt 13 and being supported free of the base belt 13 by the ends of the inclined rollers 15, which situation permits material spillage.

Since, as previously described with regard to FIG. 2, the lateral sections 30 of the retaining belt are at least substantially unreinforced longitudinally and the center section 28 containing the plies 29 of tension elements is only less than one-half the width of the unreinforced sections 30, the retaining belt 14 is able to drape over and firmly contain the material 11 being conveyed. The edge portions 31 of the retaining belt 14 extend from the lateral sections 30 of the belt 14 and conform to the confronting surface of the edges of the conveying belt 13 thereby effecting a seal to contain the lump material 11 being conveyed thereon. In this way, the material 11 is prevented from being blown or bounded off the conveying belt 13 during its course of travel. This special edge construction of the retaining belt 14 is desirable particularly when lump materials, such as ore and coal, are being transported, since the lumps tend to migrate toward the edge of he troughed conveying belt 13. Accordingly, the weighted edge portions 31 of the retaining belt 14 conform to the surface of the edges of the conveying belt 13, thus creating a seal to prevent the lump from spilling or holding up adjacent portions of the retaining belt 14 edge so that small lumps or fines escape. Furthermore, in high transverse wind conditions, the added weight thereby provided at the belt edges also helps to keep the base conveying belt 13 from flipping or turning over.

Figure 5:
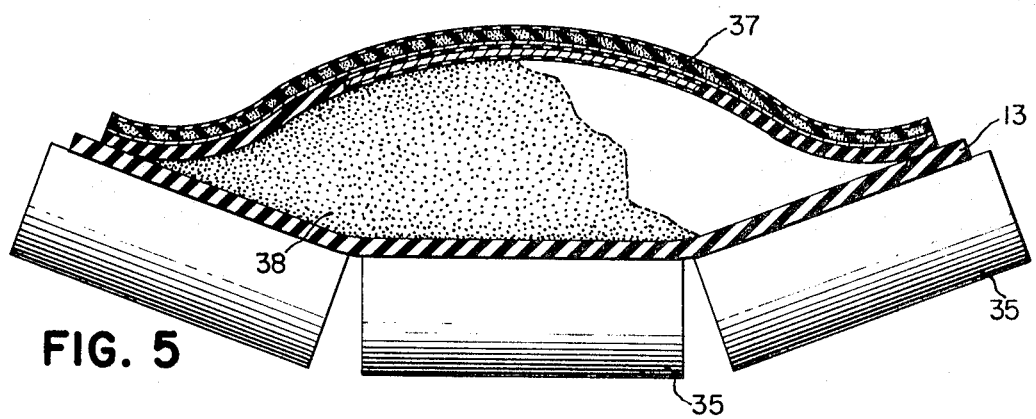
FIG. 5 is a modification of the invention shown in FIG. 4.
Figure 6:
FIG. 6 is a sectional view of the material-retaining belt shown in FIG. 5.

Another form of the invention is shown in FIGS. 5 and 6. In his modification, the material retaining belt 37 is of rectangular cross section and adapted for use in conveying fine granular material 38, such as sand. This type material 38, like the lumpy material, tends to be moved or migrated toward the edges of the troughed material-conveying belt 13 but because of its small size, does not become wedged between the belts 13 and 37. Consequently, in this situation, spillage between the belts 13 and 37 is not a problem and specially constructed edge portions of the type shown in FIG. 2 are not necessary.

It is also within the teachings of this invention to distribute the weight of the retaining belt in such a manner that the weight per unit area in its center or intermediate area is greater than the weight of its lateral edges.

Figure 7:
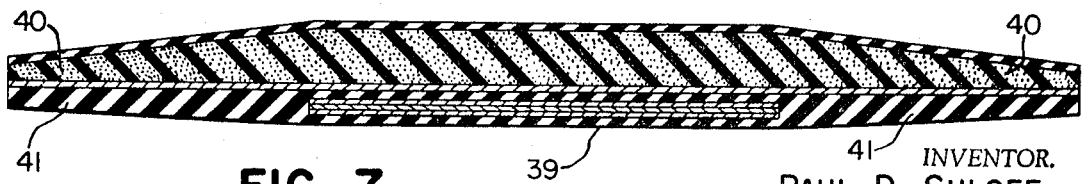
FIG. 7 is another modification of the invention shown in FIG. 4.

FIG. 7 shows an embodiment of the invention in which the retaining belt 39 is constructed so that the maximum weigh is concentrated in the center or intermediate area of the belt. This, for example, is accomplished by tapering or stepping down the first and second portions 40 and 41 of the belt 39 so that the cross-sectional dimensions at the extreme edges of the portions 40 and 41 are smaller than the cross-sectional dimensions in the center of the portions 40 and 41. As shown in FIG. 7, the other construction features of the retaining belt 39 are similar to those of the belt 14 shown in FIG. 2. A belt of this construction is better able to limit slippage of the load being carried on the conveying belt since the maximum weight of the load is also concentrated in the center of the conveying belt. However, it should be realized that a material-retaining belt with a tapered construction is more difficult to manufacture than the same belt with a rectangular cross-sectional configuration.

Those skilled in the art are aware that without a retaining belt, the coefficient of friction between the conveying belt surface and the load limits the angle of inclination at which the load can be conveyed. Angles of inclination for most bulk materials cannot exceed about 20 degrees. The required coefficient of friction between the belt and the load to prevent the load from slipping is calculated by dividing the forces acting normal to the conveying belt (total weight times the cosine of the angle of inclination) by the forces acting parallel to the conveying belt (total weight times the sine of he angle of inclination). As stated another way, the coefficient of friction must be equal to or greater than the tangent of the angle of incline.

The weighted material-retaining belt of this invention permits the material-conveying belt over which it travels to negotiate a much steeper angle of inclination without slippage of the material being conveyed. With a properly designed belt, angles of up to 45 degrees can be negotiated. This is true due to the significant quantity of added weight acting normal to the conveying belt provided by the weight of the retaining belt and the additional driving force imparted to the load on the conveying belt by virtue of the frictional forces acting parallel to and between the load and the retaining belt which is also driven. Thus, the weight of the retaining belt will add to the forces acting normal to the conveying belt, and the driving force of the retaining belt will subtract from the forces acting parallel to the conveying belt thereby reducing the required coefficient of friction between the surfaces of the conveying belt and the load. From this it should be realized that the power applied to the retaining belt and the belt's weight are interrelated. Note that the force acting parallel to the conveying belt due to the weight of the retaining belt can be ignored in power requirement determinations since it is substantially balanced by a similar and opposite force due to the return run of the belt. The lower required coefficient of friction resulting from the use of the retaining belt enables the conveying belt to travel up steeper inclines without spilling the material being conveyed.

If is noteworthy that a given retaining belt is more effective in preventing the mass sliding of light material such as coal, than that of heavier material, such as iron ore. This is because of the larger relative weight of the retaining belt with respect to the relative weight of the materials. Consequently, the relatively lightweight materials obtain the greatest benefit from the effects of a given retaining belt.

While certain representative embodiments and details have been shown for the purpose of illustrating the invention, it will be apparent to those skilled in the art that various changes and modifications may be made therein without departing from the spirit or scope of the invention.

What is claimed is:
1. A flexible, resilient, material-retaining belt of the type used as a cover belt disposed above and in confronting relationship to a material-conveying base conveyor belt in a conveyor system in which the two belts cooperate to transport bulk material from one level to another without spillage or slippage thereof, said retaining belt having a generally rectangular cross section through at least the majority of the width thereof and including:
   A. first portion of elastomeric material extending substantially longitudinally and transversely thereof;
   B. a second portion of elastomeric material adjacent to and in substantially parallel relationship with said first portion and contacting the material being conveyed, said second portion having:
      1. a center section containing a plurality of tension elements extending longitudinally of the retaining belt to prevent excessive elongation thereof, with the width of said center section being less than about one-half the width of the retaining belt; and
      2. at least substantially longitudinally unreinforced lateral sections adjacent to said center section on either side thereof to provide a maximum amount of transverse flexibility in said unreinforced section with each said lateral section having a substantial width in relation to the width of said center section thereby permitting said retaining belt to drape over and firmly contain the material being conveyed; and C. weighting means included in a least said first portion to hold said retaining belt against the material being conveyed, thereby preventing the slippage thereof on the surface of the conveying belt and enabling the conveying belt to traverse small radius concave curves in its path of travel and all said portions being formed into an integral composite structure.

2. The retaining belt as claimed in claim 1 wherein said belt includes at least one layer of bias laid textile cords to provide said retaining belt with the necessary internal strength.

3. The retaining belt as claimed in claim 1 wherein a cover layer of elastomeric material is positioned adjacent to said first portion on the side thereof opposite that of said second portion.

4. The retaining belt as claimed in claim 3 wherein said second portion and said cover layer is composed of a high abrasion resistant elastomeric material.

5. The retaining belt as claimed in claim 1 wherein said elastomeric material of said first portion has a specific gravity of at least 3.00.

6. The retaining belt as claimed in claim 5 wherein the weighting means is a metallic particulate material dispersed in the elastomeric material, said material having a specific gravity of at least 6.00.

7. The retaining belt as claimed in claim 1 wherein said belt also includes edge portions extending longitudinally thereof and associated with the lateral sections of said second portion, said edge portions adapted to conform to the confronting surface of the edges of the conveying belt, thereby effecting a seal to contain the material being conveyed thereon.

8. The retaining belt as claimed in claim 7 wherein the bulk material being conveyed is in lump form and said edge portions are in the form of weighted blocks extending from the lateral sections of said second portion.

9. The retaining belt as claimed in claim 1 wherein said blocks are continuous ribs of weighted elastomeric material integrally formed with said second portion.

10. The retaining belt as claimed in claim 8 wherein said blocks are composed of metal.

11. The retaining belt as claimed in claim 1 wherein the weight per unit area in the center thereof is greater than the weight per unit area at the lateral edges thereof.

12. In a belt conveyor system for transporting bulk material from one level to another including supporting structure and driving means therefore and wherein a material-retaining cover belt is disposed above and in confronting relationship to a material-conveying base belt and the two belts are driven by a driving means at synchronous speeds thereby cooperating to transport the material therebetween from one level to another, the improvement wherein said retaining belt is of a generally rectangular cross section through at least the majority of the width and includes:

A. a first portion of elastomeric material extending substantially longitudinally and transversely thereof;

B. a second portion of elastomeric material adjacent to and in substantially parallel relationship with said first portion and contacting the material being conveyed, said second portion having:

1. a center section containing a plurality of tension elements extending longitudinally of the retaining belt to prevent excessive elongation thereof with the width of said center section being less than one-half the width of the retaining belt; and 2. at least substantially longitudinally unreinforced lateral sections adjacent to said center section on either side thereof to provide a maximum amount of transverse flexibility in said unreinforced sections with each said lateral section having a substantial width in relation to the width of said center section thereby permitting and retaining belt to drape over and firmly contain the material being conveyed; and C. weighting means included in at least said first portion to hold said retaining belt against the material being conveyed, thereby preventing the slippage thereof on the surface on the conveying belt and enabling the conveying belt to traverse small radius concave curves in its path of travel and all said portions being formed into an integral composite structure with the weight of said retaining belt preventing the slippage of the bulk material and the overall weight provided by the combination of said belts resisting effects of high wind conditions which might otherwise result in the belts being blown off the supporting structure.

13. The improvement as claimed in claim 12 wherein said belt also includes edge portions extending longitudinally thereof and associated with the lateral sections of said second portion, said edge portion adapted to conform to the confronting surface of the edges of the conveying belt, thereby effecting a seal to contain the material being conveyed thereon.

* * * * *

PO-1050
(5/69)

UNITED STATES PATENT OFFICE
CERTIFICATE OF CORRECTION

Patent No. 3,618,746    Dated November 9, 1971

Inventor(s) Paul D Suloff

It is certified that error appears in the above-identified patent and that said Letters Patent are hereby corrected as shown below:

Column 1, line 43, after "been" insert --of--.

Column 3, line 26, "belt" should read --belts--.

Column 4, line 12, "nd" should read --and--;
line 18, after "in" insert --a--, after "44" insert --inch--;
line 19, after "18" insert --inches--;
line 38, "portions 32" should read --portions 31--;
line 48, delete "of" and after "preferably" insert --of bias-laid--;
line 51, "material" should read --flexibility--;
line 58, "s" should read --as--;
line 61, "this" should read --these--;
line 75, after "is" insert --of--.

Column 5, line 46, "his" should read --this--.

Column 6, line 10, "he" should read --the--.

Column 7, line 39, "1" should read --8--.

Column 8, line 2, "therefore" should read --therefor--.

Signed and sealed this 6th day of June 1972.

(SEAL)
Attest:

EDWARD M. FLETCHER, JR.
Attesting Officer

ROBERT GOTTSCHALK
Commissioner of Patents